United States Patent [19]

Ishige et al.

[11] 4,433,156

[45] Feb. 21, 1984

[54] PROCESS FOR PREPARING FLUORAN DERIVATIVES

[75] Inventors: Sadao Ishige; Kozo Sato; Ken Iwakura, all of Kanagawa, Japan

[73] Assignee: Fuji Photo Film Co., Ltd., Kanagawa, Japan

[21] Appl. No.: 365,129

[22] Filed: Apr. 5, 1982

[30] Foreign Application Priority Data

Apr. 3, 1981 [JP]  Japan .................................. 56-50258

[51] Int. Cl.³ ............................................ C07D 493/10
[52] U.S. Cl. .................................... 549/227; 548/456; 548/442; 548/525; 548/407; 549/60
[58] Field of Search ................. 549/227, 226; 548/407

[56] References Cited

U.S. PATENT DOCUMENTS 4,188,343  2/1980  Sakoda et al. ...................... 562/456
4,264,506  4/1981  Bonor et al. ........................ 549/394

OTHER PUBLICATIONS

R. G. R. Bacon et al., Quarterly Reviews, vol. 19 (1965) pp. 95–97, 122–123.

*Primary Examiner*—Norma S. Milestone
*Attorney, Agent, or Firm*—Sughrue, Mion, Zinn, Macpeak & Seas

[57] ABSTRACT

A process for preparing 3,6-bis-diarylaminofluoran derivatives which comprises reacting a 3,6-bis-arylaminofluoran derivative with an arylating agent.

4 Claims, No Drawings

PROCESS FOR PREPARING FLUORAN DERIVATIVES

FIELD OF THE INVENTION

This invention relates to a process for preparing fluoran derivatives.

BACKGROUND OF THE INVENTION

The fluoran derivatives are extremely useful as dye precursors for recording materials, particularly pressure-sensitive recording materials, heat-sensitive recording materials, and electro-recording materials. However, conventionally known general processes for synthesizing such fluoran derivatives have problems with respect to yield and the reaction apparatus. Therefore, it has been difficult to conduct such processes on an industrial scale.

Examples of well known general processes for synthesizing 3,6-diaminofluoran derivatives are shown by the two following schemes A and B (Beilsteil Handbuch, vol. 19, pp. 342-4).

However, where R and R' both represent an aryl group, the above-described two processes have serious problems. For example, in the process of scheme A, synthesis of a starting material m-hydroxytriarylamine (V) is difficult. Ordinary reaction between diarylamine (IV) and resorcin requires elevated temperatures of 200° C. or higher in the presence of an acid catalyst such as phosphoric acid. Therefore, corrosion-resistant special reaction apparatuses are required. In addition, this process does not give a satisfactory yield of the end product.

An alternative process of reacting diarylamine (IV) with m-iodoanisole according to Ullmann reaction and demethylating the resulting product to obtain compound (V) has problems with respected to availability of m-iodoanisole. Futhermore, the Ullmann reaction requires high temperatures and a long reaction time. Thus, this process is not an advantageous synthesis process.

On the other hand, in the process of scheme B, the yield in the final reaction is seriously low. In addition, isolation and purification of an intended fluoran derivative is quite difficult. Thus, it is extremely difficult to Scheme A

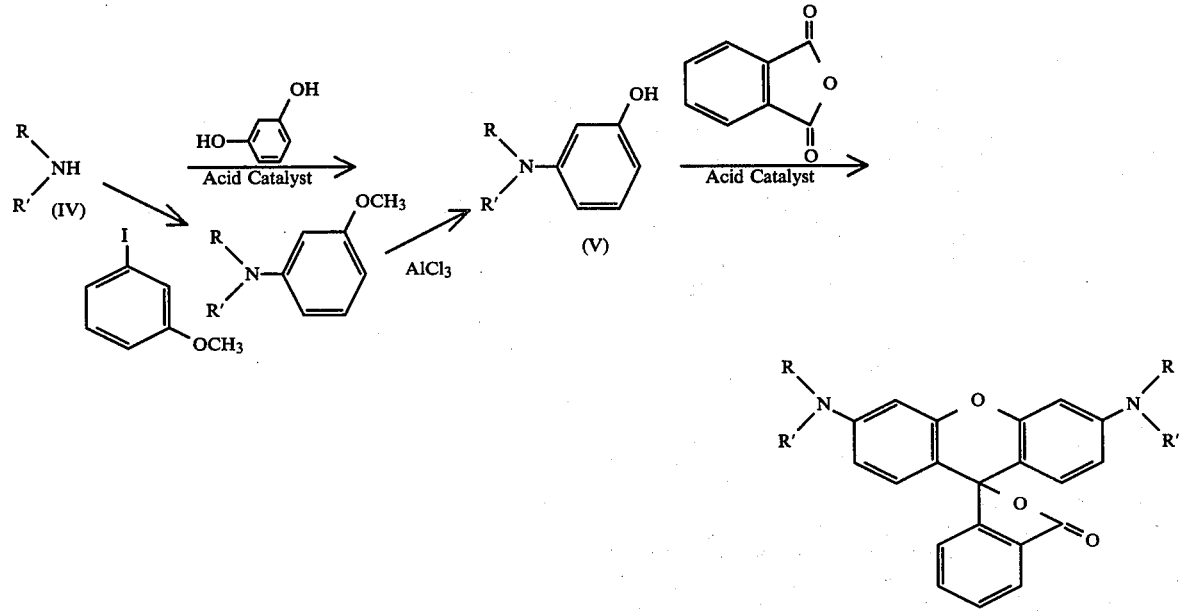

Scheme B

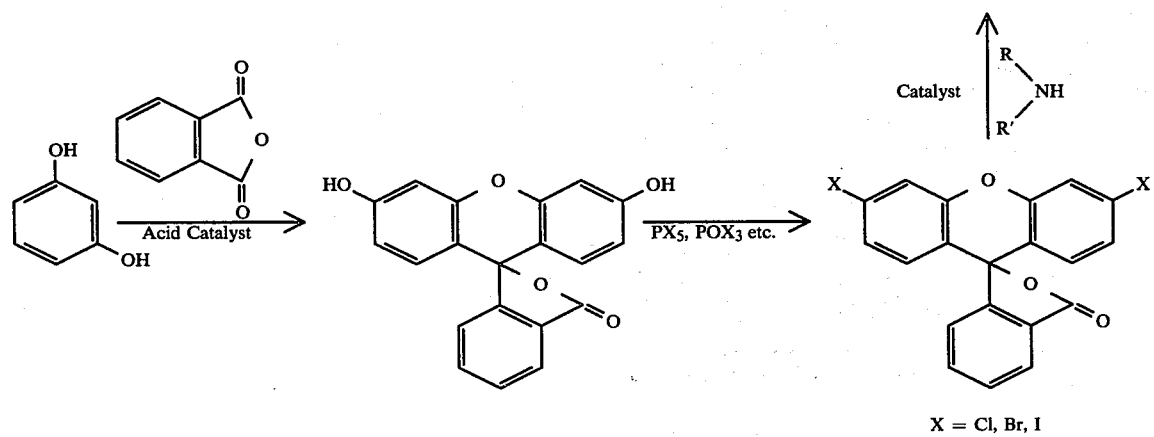

X = Cl, Br, I industrially produce the fluoran derivatives according to either process.

SUMMARY OF THE INVENTION

An object of the present invention is to provide a novel and advantageous process for preparing 3,6-bis-diarylaminofluoran derivatives (III) useful as dye precursors for various recording materials.

This object has now been successfully attained by a process of reacting a 3,6-bis-arylaminofluoran derivative represented by the following general formula (I) with an arylating agent represented by the following general formula (II):

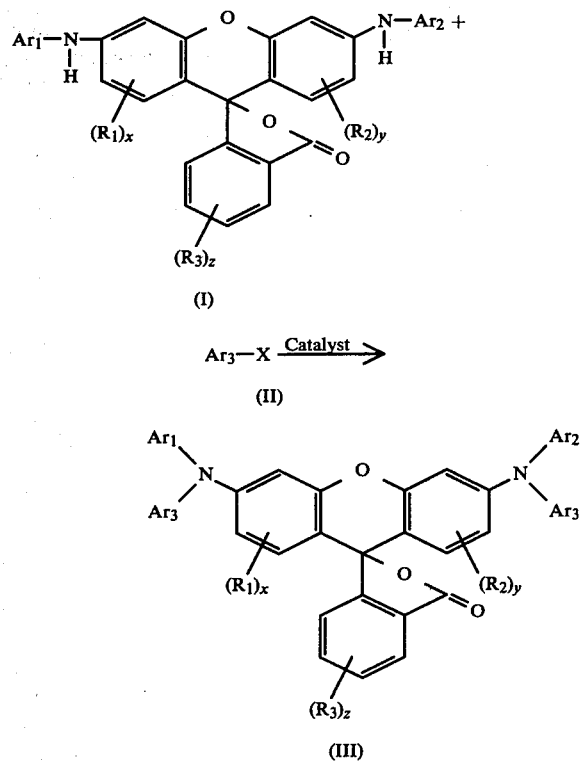

wherein $Ar_1$, $Ar_2$, and $Ar_3$, which may be the same or different, each represents an aryl group having 6 to 8 carbon atoms, X represents a halogen atom or a sulfonyloxy group represented by $-OSO_2R_4$, $R_1$, $R_2$, and $R_3$, which may be the same or different, each represents an alkyl group having 1 to 10 carbon atoms, an alkoxy group having 1 to 10 carbon atoms, a halogen atom, a nitro group, an amino group, an alkylamino group, a dialkylamino group or an acylamino group, $R_4$ represents an alkyl group having 1 to 10 carbon atoms or an aryl group having 6 to 18 carbon atoms, x and y each represents 0 or an integer of 1 to 3, and z represents 0 or an integer of 1 to 4.

DETAILED DESCRIPTION OF THE INVENTION

The present invention relates to a novel process for synthesizing 3,6-bis-diarylaminofluoran derivatives represented by the general formula (III) in a high yield by reacting 3,6-bis-arylaminofluoran derivative (I) with an arylating agent (II) under heating in the presence of a catalyst.

In the above-described process of the present invention, additives such as bases may be added in addition to the catalyst, and a reaction solvent may or may not be used.

The aryl groups represented by $Ar_1$, $Ar_2$, and $Ar_3$ in the above-described general formulae (I), (II), and (III) may be the same or different, and preferably include a phenyl group, an α-naphthyl group, a β-naphthyl group, a furyl group, a pyrrolyl group, a thienyl group, an indolyl group, a carbazoyl group, etc. These aryl groups may optionally have substituents such as an alkyl group having 1 to 10 carbon atoms, an alkoxy group having 1 to 10 carbon atom, an aryloxy group, a halogen atom, a dialkylamino group, an acylamino group, and a nitro group.

Of these, particularly preferable examples include a phenyl group, an alkyl-substituted phenyl group totally containing 7 to 10 carbon atoms, an alkoxy-substituted phenyl group totally containing 7 to 10 carbon atoms, a dialkylamino-substituted phenyl group totally containing 8 to 10 carbon atoms, a phenyl group having 1 to 2 chlorine atoms, and a β-naphthyl group.

With respect to the arylating agent represented by the general formula (II), preferable examples of X include a chlorine atom, a bromine atom, an iodine atom, a methanesulfonyloxy group, a benzenesulfonyloxy group, a toluenesulfonyloxy group, a p-chlorobenzenesulfonyloxy group, and a p-nitrobenzenesulfonyloxy group, with a bromine atom, an iodine atom, and a p-nitrobenzenesulfonyloxy group being particularly preferable.

In general formula (II), the substituent represented by $R_4$ may further have a substituent or substituents.

Known starting materials and processes for synthesizing 3,6-bis-arylaminofluoran derivatives represented by the general formula (I) which are as starting material in the process of the present invention, include those shown by the following schemes C, D, E, and F (Beilstein Handbuch, vol. 19, p. 346 incorporated herein by reference).

Scheme C

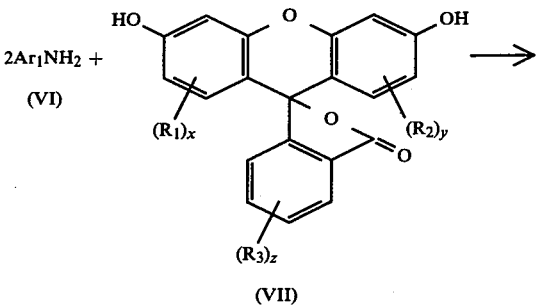

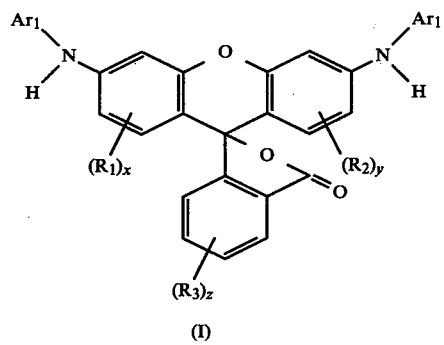

Scheme D

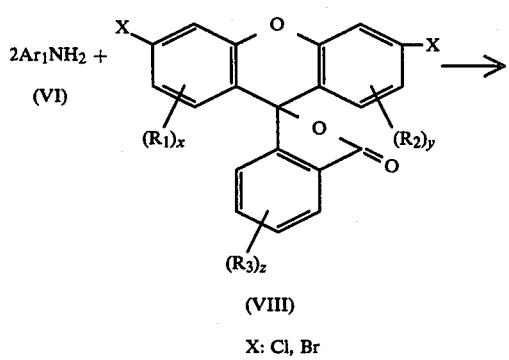

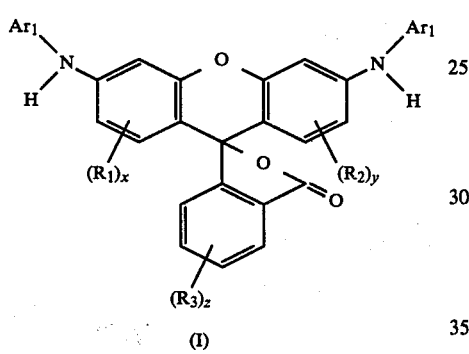

Scheme E

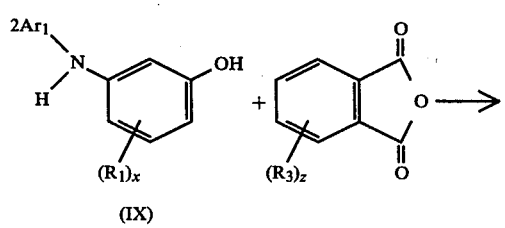

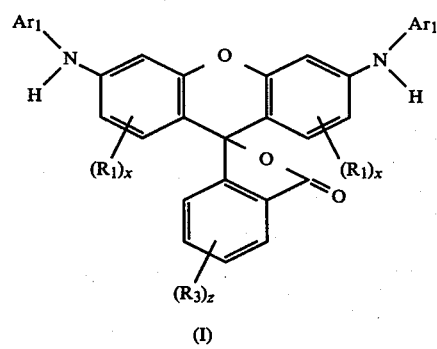

Scheme F

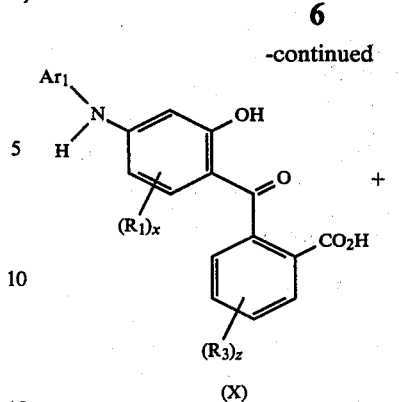

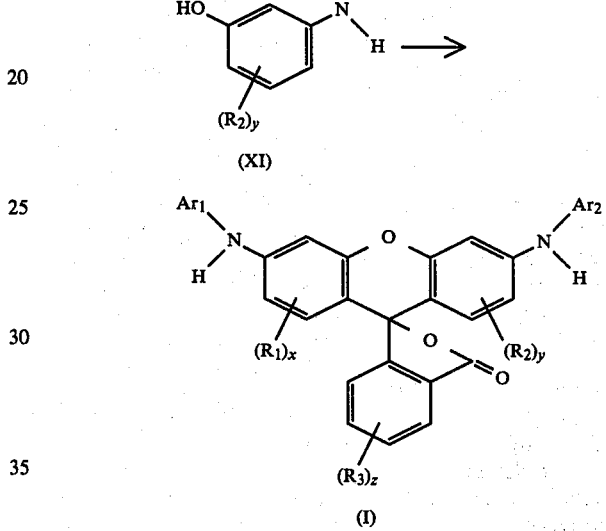

The process of scheme C is a process for obtaining compound (I) by a dehydration reaction between aromatic amine (VI) and fluorescein derivative (VII) under heat in the presence of a catalyst. The process of scheme D is a process for obtaining compound (I) by heating aromatic amine (VI) and 3,6-dihalogenofluoran derivative (VIII) in the presence of a base to cause dehydrohalogenation. The process of scheme E is a process of condensing m-hydroxydiarylamine derivative (IX) with a phthalic anhydride derivative under heat in the presence of an acid catalyst. The process of scheme F is a process of condensing 2-(4-arylamino-2-hydroxybenzoyl)-benzoic acid derivative (X) with m-arylaminophenol derivative (XI) under the same conditions as in the process of scheme E.

Typical examples of 3,6-bisarylaminofluoran of the general formula (I) to be used as starting material in the present invention include 3,6-bis-phenylaminofluoran, 3,6-bis-p-tolylaminofluoran, 3,6-bis-p-anisylaminofluoran, 3,6-bis-p-dimethylaminophenylaminofluoran, 3,6-bis-p-chlorophenylaminofluoran, 3-phenylamino-6-p-tolylaminofluoran, 3-phenylamino-6-p-anisylaminofluoran, 3,6-bis-naphthylaminofluoran, 3,6-bis-m-tolylaminofluoran, 3,6-bis-o-tolylaminofluoran, 3,6-bis-m-anisylaminofluoran, 3,6-bis-o-anisylaminofluoran, 3,6-bis-m-chlorophenylaminofluoran, 3,6-bis-o-chlorophenylaminofluoran, 3,6-bis-p-phenethylaminofluoran, 3,6-bis-p-t-butylphenylaminofluoran, 3,6-bis-p-n-butylphenylaminofluoran, 3,6-bis-p-acetylaminophenylaminofluoran, etc.

Typical examples of the arylating agent represented by the general formula (II) include iodobenzene, bromobenzene, p-iodotoluene, m-iodotoluene, p-iodoanisole, m-iodoanisole, p-iodochlorobenzene, m-iodochlorobenzene, p-n-butyl-iodobenzene, phenyl methanesulfonate, phenyl benzenesulfonate, phenyl p-chlorobenzenesulfonate, phenyl p-nitrobenzenesulfonate, p-tolyl p-nitrobenzenesulfonate, p-anisyl p-nitrobenzenesulfonate, etc.

Useful catalysts for the present invention include metallic copper dust, copper compounds such as cuprous chloride, cupric chloride, cuprous bromide, cupric bromide, cuprous iodide, cupric iodide, copper chelate complex, etc., nickel compounds such as nickelous chloride, nickelous bromide, nickel chelate complex, etc., and cobalt compounds. Fine-powdered metallic copper dust is particularly preferable.

Useful additives include potassium carbonate, sodium carbonate, magnesium oxide, calcium oxide, sodium iodide, potassium iodide.

Useful solvents include organic solvents having a boiling point of 130° C. or more. For example, aromatic organic solvents are preferably used such as xylene, nitrobenzene, o-nitrotoluene, dichlorobenzene, trichlorobenzene, biphenylanisole, alkyl-substituted naphthalene, diphenylalkane, alkyl-substituted diphenylalkane, alkyl-substituted biphenyl, triarylmethane, phthalic ester, salicylic ester, benzoic acid ester, triphenyl phosphate, tricresyl phosphate, etc.

A preferred embodiment of the process of the present invention is described below.

1.0 Mol of 3,6-bis-arylaminofluoran derivative represented by the general formula (I) is reacted with 2.0 to 10.0 mols, preferably 2.0 to 4.0 mols, of an arylating agent represented by the general formula (II) in the presence of a catalyst at temperatures of 140° to 300° C., preferably 200° to 250° C., for 2 to 20 hours. The reaction solution is cooled and, if necessary, an organic solvent is added thereto, followed by treatment with decolorizing carbon. Then, the organic solvent is distilled off. Recrystallization is conducted, if necessary, using benzene, toluene, ethyl acetate or the like to obtain a 3,6-bis-diarylaminofluoran derivative represented by the general formula (III).

Additionally, when alkyl-substituted naphthalene, diphenylalkane, alkyl-substituted diphenylalkane, alkyl-substituted diphenyl, triarylmethane, phthalic ester, salicylic acid ester, benzoic acid ester or the like is used as a reaction solvent, the solvent may be used, without being distilled off, as capsule core material for pressure-sensitive paper.

The present invention will now be described in more detail by reference to preferred embodiments of the present invention which, however, are not to be construed as limiting the present invention in any way.

EXAMPLE 1

Preparation of 3,6-bis-diphenylaminofluoran

A mixture of 46.8 g (0.1 mol) of 3,6-bis-phenylaminofluoran, 61 g (0.3 mol) of iodobenzene, 3 g of copper dust, and 21 g of potassium carbonate was heated to 250° C. for 5 hours under stirring. After allowing the reaction mixture to cool, toluene and decolorizing carbon were added thereto. Then, toluene and excess iodobenzene were distilled off. Recrystallization of the residue from benzene/hexane yielded 53.5 g of 3,6-bis-diphenylaminofluoran having a melting point of 161° to 174° C.

EXAMPLE 2

Preparation of 3,6-bis-(N-phenyl-N-$\beta$-naphthyl)aminofluoran

A mixture of 28.4 g (0.05 mol) of 3,6-bis-$\beta$-naphthylaminofluoran, 61 g of iodobenzene (0.3 mol), 2 g of copper dust, 21 g of potassium carbonate, and 100 ml of nitrobenzene was refluxed for 10 hours under heating. Inorganic matters were removed by filtration, and nitrobenzene and excess iodobenzene were distilled off by steam distillation. Toluene and decolorizing carbon were added to the residue to conduct decolorizing treatment. Then, n-hexane was added to crystallize. Crystals thus formed were collected by filtration to obtain 20.4 g of 3,6-bis(N-phenyl-N-$\beta$-naphthyl)aminofluoran having a melting point of 230° to 260° C.

EXAMPLE 3

Preparation of 3,6-bis-di-p-tolylaminofluoran

A mixture of 49.6 g (0.1 mol) of 3,6-bis-p-tolylaminofluoran, 65 g (0.3 mol) of p-iodotoluene, and 13 g of copper dust was heated to 250° C. for 7 hours under stirring. After allowing the reaction mixture to cool, toluene and decolorizing carbon were added to conduct decolorizing treatment. Then, toluene and excess p-iodotoluene were distilled off under reduced pressure. Recrystallization of the residue from benzene/hexane yielded 59.8 g of 3,6-bis-di-p-tolylaminofluoran having a melting point of above 300° C.

EXAMPLE 4

Preparation of 3,6-bis-di-p-tolylaminofluoran

A mixture of 49.6 g (0.1 mol) of 3,6-bis-p-tolylaminofluoran, 65 g (0.3 mol) of p-iodotoluene, 4 g of copper dust, 21 g of potassium carbonate, and 300 ml of diisopropylnaphthalene was heated for 10 hours under stirring. Excess p-iodotoluene was distilled off under reduced pressure. Then, diisopropylnaphthalene and decolorizing carbon were added thereto to perform a decolorizing treatment. Thus, there was obtained a diisopropylnaphthalene solution of 3,6-bis-di-p-tolylaminofluoran.

EXAMPLE 5

Preparation of 3,6-bis-(N-phenyl-N-p-tolyl)-aminofluoran

A mixture of 49.6 g (0.1 mol) of 3,6-bis-p-tolylaminofluoran, 50 g (0.25 mol) of iodobenzene, and 13 g of copper dust was heated to 250° C. for 15 hours under stirring. After allowing the reaction mixture to cool to 100° C., 1-phenyl-1-xylylethane and decolorizing carbon were added thereto to perform a decolorizing treatment. Excess iodobenzene was distilled off under reduced pressure to obtain a 1-phenyl-1-xylylethane solution of 3,6-bis-(N-phenyl-N-p-tolyl)aminofluoran (m.p. 156° to 160° C.).

EXAMPLE 6

Preparation of 3,6-bis-(N-phenyl-N-p-anisyl)aminofluoran

A mixture of 52.8 g (0.1 mol) of 3,6-bis-p-anisylaminofluoran, 81 g (0.4 mol) of iodobenzene, 4 g of copper dust, and 30 g of potassium carbonate was heated to 230° C. for 3 hours under stirring. After cooling to 100° C., toluene and decolorizing carbon were added thereto to conduct a decolorizing treatment. Then, toluene and excess iodobenzene were distilled off under reduced pressure. Recrystallization of the residue from n-hexane yielded 62.1 g of 3,6-bis-(N-phenyl-N-p-anisyl)aminofluoran (m.p. 155° to 158° C.).

EXAMPLE 7
Preparation of 3,6-bis-di-p-anisylaminofluoran

A mixture of 52.8 g (0.1 mol) of 3,6-bis-p-anisylaminofluoran, 56.2 g (0.24 mol) of p-iodoanisole, 2 g of copper dust, and 30 g of potassium carbonate was heated to 270° C. for 4 hours. After cooling to 100° C., toluene and decolorizing carbon were added thereto to conduct decolorizing treatment. Then, toluene and excess iodobenzene were distilled off under reduced pressure. Recrystallization of the residue from toluene/hexane yielded 59 g of 3,6-bis-di-p-anisylaminofluoran (m.p. 300° to 303° C.).

EXAMPLE 8
Preparation of 3,6-bis-diphenylaminofluoran

A mixture of 46.8 g (0.1 mol) of 3,6-bis-phenylaminofluoran, 78.5 g (0.5 mol) of bromobenzene, 3 g of copper dust, and 21 g of potassium carbonate was heated to 250° C. for 20 hours. After allowing the reaction mixture to cool, toluene and decolorizing carbon were added thereto to conduct decolorizing treatment. Toluene and excess bromobenzene were distilled off under reduced pressure. Recrystallization of the residue from benzene/hexane gave 6.3 g of 3,6-bis-diphenylaminofluoran.

EXAMPLE 9
Preparation of 3,6-bis-(N-phenyl-N-p-tolyl)aminofluoran

A mixture of 46.8 g (0.1 mol) of 3,6-bis-phenylaminofluoran, 78.0 g (0.3 mol) of p-tolyl-p-nitrobenzenesulfonate, 40 g of magnesium oxide, and 100 ml of trichlorobenzene was heated to 230° C. for 15 hours. After allowing the reaction mixture to cool, toluene and decolorizing carbon were added thereto to conduct a decolorizing treatment. Then, toluene and trichlorobenzene were distilled off under reduced pressure. Recrystallization of the residue from benzene/hexane gave 4.5 g of 3,6-bis-(N-phenyl-N-p-tolyl)aminofluoran.

The following examples show embodiments of preparing the starting material (I) according to scheme D and then using the resulting product without isolation thereof for the process of the present invention to prepare compound (III) in a continuous manner.

EXAMPLE 10
Preparation of 3,6-bis-di-p-tolylaminofluoran

A mixture of 105 g (1.0 mol) of p-toluidine, 148 g (0.4 mol) of 3,6-dichlorofluoran, 5 g of copper dust, and 69 g of potassium carbonate was heated to 230° C. for 3 hours under stirring. Excess p-toluidine was distilled off under reduced pressure. Then, 650 g (3.0 mols) of p-iodotoluene and 10 g of copper dust were added thereto, and the resulting mixture was heated to 250° C. for 10 hours. After allowing the reaction mixture to cool, toluene and decolorizing carbon were added thereto to conduct a decolorizing treatment. Toluene and excess p-iodotoluene were distilled off under reduced pressure. Recrystallization of the residue from benzene/hexane gave 495 g of 3,6-bis-di-p-tolylaminofluoran.

EXAMPLE 11
Preparation of 3,6-bis-(N-phenyl-N-p-anisyl)aminofluoran

A mixture of 123 g (1.0 mol) of p-anisidine, 222 g (0.5 mol) of 3,6-dibromofluoran, 5 g of copper dust, and 69 g of potassium carbonate was heated to 250° C. for 3 hours. Then, 400 g (2.0 mols) of iodobenzene and 5 g of copper dust were added thereto, followed by heating to 250° C. for 5 hours under stirring. After cooling, toluene and decolorizing carbon were added thereto to conduct a decolorizing treatment. Then, toluene and excess iodobenzene were distilled off under reduced pressure. Recrystallization of the residue gave 580 g of 3,6-bis-(N-phenyl-N-p-anisyl)aminofluoran.

A comparative example according to scheme B will be described below.

COMPARATIVE EXAMPLE 1
Synthesis of 3,6-bis-diphenylaminofluoran

A mixture of 44.4 g (0.1 mol) of 3.6-dibromofluoran, 51.0 g (0.3 mol) of diphenylamine, 10 g of copper dust, and 31 g of potassium carbonate was heated to 250° C. for 20 hours under stirring. After cooling, toluene and decolorizing carbon were added thereto to conduct decolorizing treatment. Then, toluene was distilled off under reduced pressure. However, recrystallization of the residue from toluene/hexane gave no end product. Silica gel column chromatography gave 0.9 g of 3,6-bis-diphenylaminofluoran.

As is clear from the results of Comparative Example 1, the process of the present invention give improved unexpected results.

While the invention has been described in detail and with reference to specific embodiments thereof, it will be apparent to one skilled in the art that various changes and modifications can be made therein without departing from the spirit and scope thereof.

What is claimed is:

1. A process for preparing 3,6-bis-diarylaminofluoran derivatives represented by the following general formula (III):

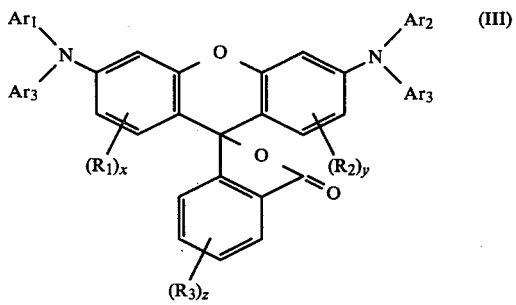

wherein each of $Ar_1$, $Ar_2$, and $Ar_3$ independently represents an aryl group, each of $R_1$, $R_2$, and $R_3$ independently represents an alkyl group, an alkoxy group, a halogen atom, a nitro group, an alkylamino group, a dialkylamino group or an acylamino group, x and y each represents 0 or an integer of 1 to 3, and z represents 0 or an integer of 1 to 4, which comprises reacting in a single reaction step a 3,6-bis-arylaminofluoran derivative represented by the following general formula (I):

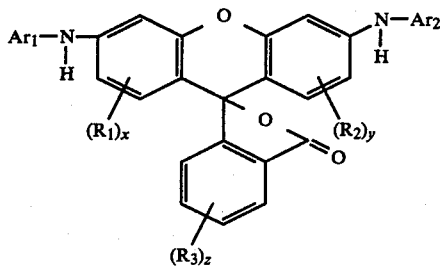

wherein $Ar_1$, $Ar_2$, $R_1$, $R_2$, $R_3$, x, y, and z are the same as defined above,
with 2.0 to 10.0 mols based on one mol of the 3,6-bis-arylaminofluoran derivative of the formula (I) of an arylating agent represented by the following general formula (III):

$$Ar_3-X \qquad (II)$$

wherein $Ar_3$ is the same as defined above, and x represents a halogen atom or a sulfonyloxy group represented by $-OSO_2R_4$ ($R_4$ represents an alkyl group or an aryl group), whereby both of the arylamino groups of the 3,6-bis-arylaminofluoran derivative of the formula (I) are arylated at the same time.

2. A process for preparing 3,6-bis-diarylaminofluoran derivative represented by the formula (III) as claimed in claim 1, wherein $Ar_1$, $Ar_2$ and $Ar_3$ in said formulae (I), (II) and (III) are independently a phenyl group, an alkyl-substituted phenyl group containing 7 to 10 carbon atoms, a alkoxy-substituted phenyl group containing 7 to 10 carbon atoms, a dialkylamino-substituted phenyl group containing 8 to 10 carbon atoms, a phenyl group containing 1 to 2 chlorine atoms, or a $\beta$-naphthyl group.

3. A process for preparing 3,6-bis-diarylaminofluoran derivative as claimed in any of claims 1 to 2, wherein X is selected from the group consisting of a chlorine atom, a bromine atom, an iodine atom, a methanesulfonyloxy group, a benzenesulfonyloxy group, a toluenesulfonyloxy group, a p-chlorobenzenesulfonyloxy group, and a p-nitrobenzenesulfonyloxy group.

4. A process for preparing a derivative as claimed in any of claims 1 to 2, wherein X is a bromine atom, an iodine atom, or a p-nitrobenzenesulfonyloxy group.

* * * * *